United States Patent [19]

White et al.

[11] 4,336,750
[45] Jun. 29, 1982

[54] STRAY CROP BUILDUP EXPELLER FOR ROTARY BALERS

[75] Inventors: Bruce L. White, North Newton; Bobby D. McWhirt, Hesston, both of Kans.

[73] Assignee: Hesston Corporation, Hesston, Kans.

[21] Appl. No.: 179,048

[22] Filed: Aug. 18, 1980

[51] Int. Cl.³ .................... B30B 5/06; A01D 39/00
[52] U.S. Cl. .................................. 100/88; 56/341
[58] Field of Search ............... 100/5, 7, 87, 88, 89, 100/76, 152; 56/341, 342, 343, 344

[56] References Cited

U.S. PATENT DOCUMENTS

| | | | |
|---|---|---|---|
| 972,884 | 10/1910 | Luebben | 100/87 X |
| 4,155,298 | 5/1979 | Gaeddert et al. | 100/87 |
| 4,182,101 | 1/1980 | Gaeddert et al. | 100/88 X |
| 4,252,057 | 2/1981 | Gaeddert et al. | 100/88 |

*Primary Examiner*—Peter Feldman
*Attorney, Agent, or Firm*—Schmidt, Johnson, Hovey & Williams

[57] ABSTRACT

The baler has a set of belts which bear against the surface of a cylindrical bale during formation thereof to compact the bale and to drive it rotatably about its longitudinal axis. Such belts are guided by shafts spanning the chamber of the baler, certain of which may be provided with annular expelling collars that rotate with the shaft and function to reject and expel stray crop material from the immediate vicinity of the shaft in order to prevent its accumulation and buildup. In the particular embodiment illustrated, the collars are attached to opposite ends of a shaft carried by the belt tensioning assembly whose shafts bear directly upon the top periphery of the bale during its formation and thus have a greater tendency than others to accumulate materials straying from the baling chamber. Preferably, the collars are used in connection with the shaft that rotates generally down and away from the area of normal accumulation such that the collars function to expel the stray material in the same downward and outward direction.

4 Claims, 5 Drawing Figures

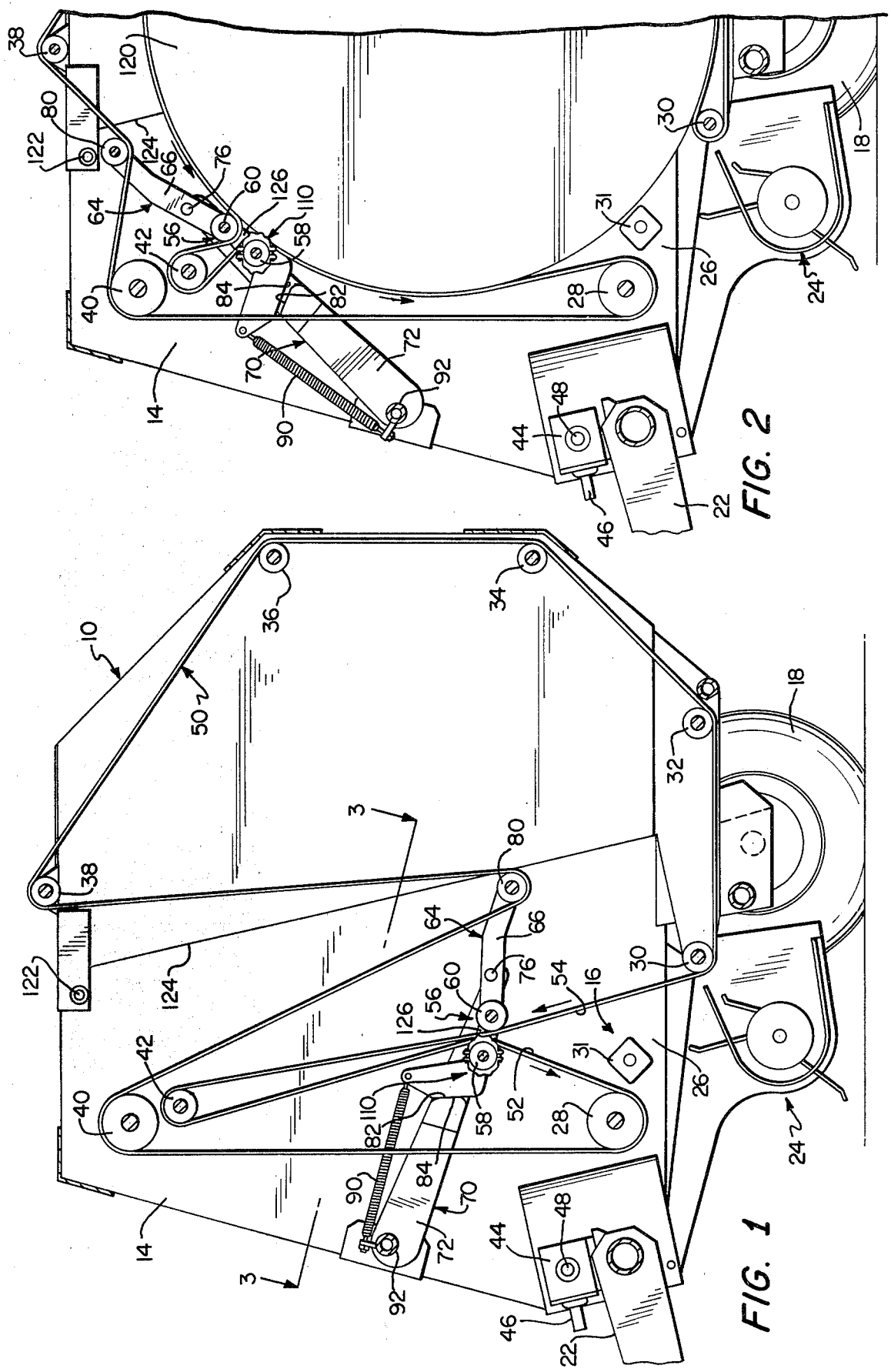

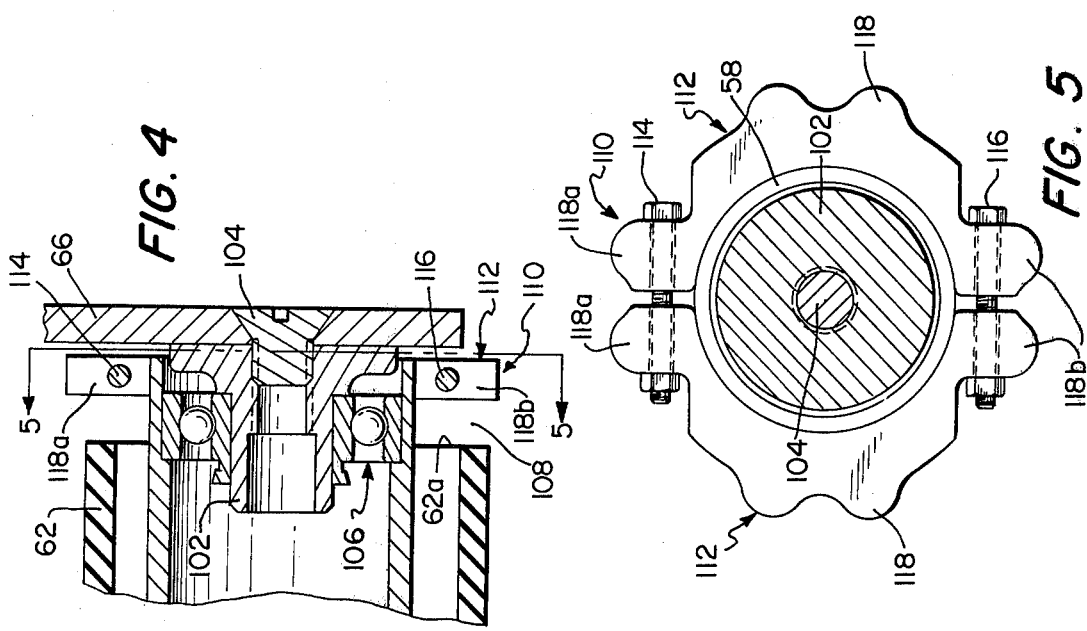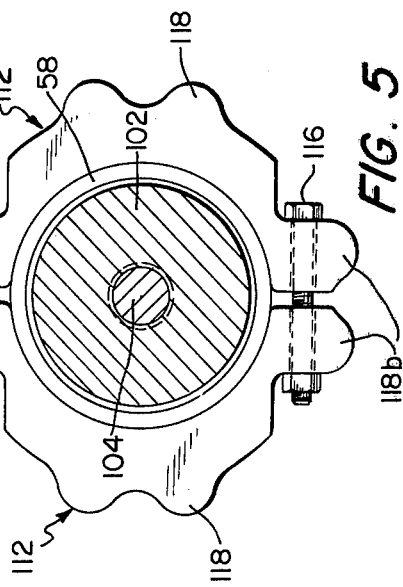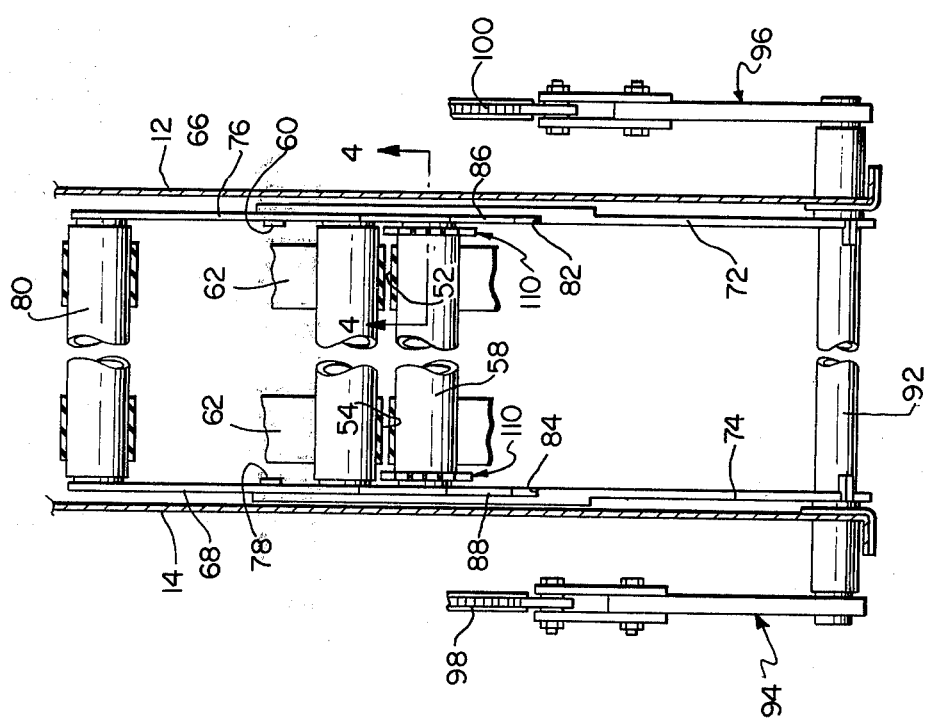

STRAY CROP BUILDUP EXPELLER FOR ROTARY BALERS

CROSS REFERENCE TO RELATED APPLICATION

This invention is related to that disclosed and claimed in prior pending application Ser. No. 06/045,197 filed June 4, 1979 in the name of Gaeddert et al. and titled "Bale Tensioning Apparatus in a Rotary Baler", now U.S. Pat. No. 4,252,057, said application being assigned to the assignee herein and being related to the present application in that the invention herein is especially suited for use in connection with the tensioning apparatus described and claimed in said prior application.

TECHNICAL FIELD

This invention relates to rotary crop balers and, more particularly, to improvements in such balers with respect to the avoidance of deleterious accumulation and buildup of stray crop materials on the baler at undesired locations.

BACKGROUND ART

Avoiding the buildup of stray crop material in the vicinity of the belts and guide shafts of a rotary baler is desirable for many reasons. Generally speaking, positions along the shafts where belts are located side-by-side have a tendency to be self-cleaning in that the two adjacent, moving belts continuously engage errant materials escaping from the baling chamber and forcefully expel such materials from the immediate vicinity of the shafts. At the ends of the shafts, however, there will normally be only a single moving belt working somewhat adjacent stationary structure supporting the shaft, and at this location there is less of a tendency for the stray materials to be expelled from the area.

Furthermore, some of the shafts seem to be more vulnerable than others to buildup. For example, the shafts 58 and 60 of the aforementioned application ride directly upon the upper periphery of the forming bale as part of the belt tensioning apparatus of the baler and tend to collect material more readily than other shafts of the machine.

SUMMARY OF THE PRESENT INVENTION

Accordingly, one object of the present invention is to provide means in connection with the shafts of a rotary baler for expelling stray crop materials from the vicinity of such shafts and their associated belts in order to alleviate the various harmful effects which might otherwise result from the buildup of such material. Still further, it is an important object of the invention to prevent buildup in the vicinity of the twin guide shafts working in close conjunction with one another on belt tensioning apparatus such as utilized in the machine of the aforementioned patent application.

In carrying out the foregoing objects, the present invention includes a collar which may be attached to one or more selected shafts of the baler for rotation therewith, such collar or collars having radially projecting portions that extend beyond the adjacent peripheries of the shafts to engage and propel contacted materials out of the immediate vicinity of the shafts. Preferably, one of such collars is attached at each end of a selected shaft between the adjacent belt edge and relatively stationary structure supporting the shaft to provide agitation and movement in that otherwise "dead" area. In the case of the tensioning apparatus of the earlier-mentioned application, it has been found most desirable to attach the collars to only one of the twin guide shafts of that apparatus which normally bear upon the periphery of the bale, such selected shaft being the "forward" shaft of the pair which rotates in a direction to expel the material downwardly and away from the gap between the two shafts as opposed to the other shaft of the pair which would have a tendency to aggressively introduce additional materials upwardly into the gap situated between the two shafts.

BRIEF DESCRIPTION OF THE DRAWINGS

FIG. 1 is a side elevational view of a rotary baler incorporating the stray crop expeller of the present invention, the near sidewall of the baler being removed and certain parts being shown in cross section to reveal details of construction;

FIG. 2 is a fragmentary side elevational view similar to FIG. 1 but showing a full sized bale within the bale chamber of the machine;

FIG. 3 is a fragmentary cross-sectional view through the baler taken substantially along line 3—3 of FIG. 1;

FIG. 4 is an enlarged, fragmentary cross-sectional view of the machine taken substantially along line 4—4 of FIG. 3; and FIG. 5 is a fragmentary cross-sectional view of an expelling collar and its associated shaft components taken substantially along line 5—5 of FIG. 4.

DETAILED DESCRIPTION

The baler 10 has a pair of laterally spaced apart sidewalls 12 and 14 that cooperate to provide the lateral extremities of a bale-forming chamber denoted broadly by the numeral 16. Although the positions of the sidewalls 12 and 14 relative to each other are fixed such that the lateral extremities or dimensions of the chamber 16 are likewise fixed, the vertical dimension of the chamber 16 as well as its fore-and-aft dimension is subject to change throughout the period that a bale is forming within the chamber 16 as will subsequently appear.

The sidewalls 12 and 14 are carried on a suitable chassis which is in turn carried by a pair of ground wheels 18 located on opposite sides of the baler 10 outboard of the respective sidewalls 12 and 14. A fore-and-aft extending tongue 22 located adjacent the front end of the baler 10 relative to its normal direction of travel adapts the same to be hitched behind a towing tractor or the like for advancement across a field having windrowed crop material deposited thereon. A pickup 24 spaced rearwardly from the front extremity of the sidewalls 12,14 and located substantially directly beneath the chamber 16 is operable to pick up windrowed material from the field as the baler 10 passes over the same and to feed such material up into the chamber 16 through an entrance 26 defined between a pair of transversely extending shafts 28 and 30 spanning the sidewalls 12,14 and located in fore-and-aft spaced relationship to one another. A cross-sectionally polygonal roller 31 spanning sidewalls 12,14 and situated rearwardly adjacent front shaft 28 keeps the bale off shaft 28 during formation.

Also spanning the sidewalls 12,14 are additional shafts arranged in a generally circular pattern progressing in a counterclockwise direction from the shaft 30, such shafts being identified by the numerals 32, 34, 36, 38, 40, and 42. The shafts 30–38 and 42 are all idler shafts, while the shaft 28 and optionally also the shaft 40 are rotatively driven in a clockwise direction viewing FIG. 1 by mechanism not illustrated. Such driving mechanism may take several different forms readily understood by those skilled in the art, and it is contemplated that a right angle gearbox 44 situated on top of the tongue 22 adjacent its rearmost end may be provided with an input shaft 46 ultimately couplable with the power-takeoff shaft (not shown) of the towing vehicle, the gearbox 44 also having an output shaft 48 at right angles to the input shaft 46 from which the driving mechanism above mentioned may receive its power for driving the shaft 28 and optionally also the shaft 40.

The bale chamber 16 is further defined by structure in the form of an endless, flexible web broadly denoted by the numeral 50 which is looped over the shaft 42 and under the shafts 28,30 in such a manner as to present a pair of generally upright, opposed web stretches 52 and 54 which, as illustrated in FIG. 1, initially move in opposite vertical directions. The web stretches 52,54 are held apart at their lower ends by the shafts 28,30 such as to present the entrance 26, and the stretches 52,54 are held close together at a location above the entrance 26 by a retaining device 56 in the nature of a pair of elongated, fore-and-aft spaced apart shafts 58,60 thus effectively closing the periphery of the chamber 16 except at the entrance 26 thereof. As shown most clearly in FIG. 3, the web 50 preferably takes the form of a series of endless, identical belts 62 spaced a short distance apart across the baler 10 and between the sidewalls 12,14.

The shafts 58,60 are supported on a lever assembly 64 having a pair of levers 66,68 spanned by the shafts 58,60. The assembly 64 in turn is pivotally supported by an arm assembly 70 that includes a pair of arms 72,74 situated slightly inboard of the respective sidewalls 12,14. A pair of aligned pivots 76,78 at the outermost ends of the arms 66,68 attach the lever assembly 64 to the arm assembly 70 and serve as the fulcrum point for the levers 66,68. Hence, it may be said that the retaining device 56 is located on one side of the fulcrum point of the lever assembly 64 while a slack-takeup shaft 80 spanning the levers 66,68 at the opposite end thereof is located on the opposite side of the fulcrum point of lever assembly 64. As illustrated, the web 50 is looped beneath the takeup shaft 80 after being looped over the shafts 38,40.

As illustrated in FIG. 3, the arms 72,74 of arm assembly 70 are generally longitudinally aligned with the levers 66,68 adjacent the inner ends of the arms 72,74 but at approximately midlength of the arms 72,74, the latter are joggled out such that the remaining portions of the arms 72,74 embrace the levers 66,68 on laterally outboard sides thereof. The points at which the arms 72,74 are joggled out present a pair of stops 82,84 respectively disposed to abuttingly engage upwardly projecting shoulders 86,88 on the proximal inner ends of the corresponding levers 66,68. Such abutting engagement of the stops 82,84 and the shoulders 86,88 serves to limit counterclockwise swinging of the lever assembly 64 about the pivots 76,78 relative to the arm assembly 70, and each of the shoulders 86,88 has a tension spring 90 (only one being shown) secured at one end thereto and at the opposite end to a remote point on the corresponding arm 72 or 74 for the purpose of yieldably biasing the shoulders 86,88 of lever assembly 64 against the stops 82,84 of arm assembly 70.

The arm assembly 70 is swingably mounted on the sidewalls 12,14 adjacent the front of the latter for generally vertical swinging movement toward and away from the lower shafts 28 and 30, thereby also rendering the retaining device 56 likewise shiftable toward and away from lower shafts 28 and 30. The arms 72,74 are interconnected adjacent their inner ends by a torque tube member 92 spanning the sidewalls 12,14 and journaled thereby so as to render the arm assembly 70 swingable in the above-described manner. The torque tube 92 projects outwardly through and beyond the sidewalls 12,14 for a short distance as illustrated in FIG. 3, at which location its opposite ends are respectively fixed to a pair of cranks 94 and 96 that are thereby caused to swing with the arm assembly 70 during the latter's movement toward and away from the lower shafts 28,30.

The outermost ends of the cranks 94,96 are respectively connected to a pair of roller chains 98 and 100 that are in turn coupled with respective tension springs (not shown). Thus, the tension springs provide yieldable force biasing the cranks 94,96 downwardly in a clockwise direction viewing FIGS. 1 and 2, for example, which likewise biases the arm assembly 70, the retaining device 56 and the slack-takeup shaft 80 downwardly toward the lower shafts 28,30.

As illustrated in FIG. 4 with respect to the shaft 58, the two shafts 58 and 60 are rotatably carried by the lever arms 66 and 68. In this regard, a spindle 102 projects inwardly from the corresponding lever 66 or 68 to be received within the tubular shaft 58. A bearing assembly 106 carried by the spindle 102 in turn bears against the inner periphery of the shaft 58 or 60 to rotatably support the same.

A space 108 is defined between the adjacent edge 62a of the belt 62 and the corresponding lever arm 66 or 68, and within the space 108 is mounted an expelling collar device denoted broadly by the numeral 110. The collar 110, of annular configuration, comprises a pair of semi-circular sections 112 clamped against opposite sides of the shaft 58 by a pair of fasteners 114 and 116 such that the two-piece collar is rendered substantially continuous along its inner and outer peripheries when clamped in place.

The outer periphery of each section 112 is provided with a series of scallops 118 to render the outer extremity undulating in nature for aggressive engagement with crop materials, the endmost scallops 118a and 118b of each section 112 being transversely perforated so as to receive the corresponding fastener 114 or 116. The inner peripheral extremity of each section 112 is smooth so as to matingly receive the periphery of the shaft 58 in tight clamping relationship thereto. As is apparent, the scallops 118 project substantially radially outwardly beyond the periphery of the shaft 58.

OPERATION

When the bale chamber 16 is empty, such as at the beginning of the baling cycle, the components of the baler 10 are disposed in the condition illustrated by FIG. 1. At such time, the arm assembly 70 is in its closest position to the lower shafts 28,30 such that the retaining device 56 is likewise in its lowermost position to maintain the chamber 16 at its smallest size.

As the baler 10 advances along a crop windrow, the pickup 24 lifts the materials off the ground and feeds it up through the entrance 26 into the chamber 16 whereupon it is acted upon by the oppositely moving, generally vertically directed belt stretches 52 and 54 so as to cause the introduced material to tumble forwardly. As additional material is thus introduced into the chamber 16, the tumbling material begins to coil up into a bale and exert radially outwardly directed forces against the belt stretches 52,54 and against the shafts 58,60 of retaining device 56. Deflection of the belt stretches 52,54 and upward movement of the retaining device 56 is, of course, resisted by the tension springs (not shown) connected to the cranks 94,96 via the chains 98,100.

As additional material continues to be fed into the chamber 16, a point is quickly reached whereat the bale core simply becomes too large for the small chamber 16 and the resistance of springs is exceeded. At that point in time the arm assembly 70 begins to yield upwardly, causing the vertical dimension of the chamber 16 to increase as the shafts 58 and 60 swing upwardly toward their extreme positions of FIG. 2. This action not only raises the upper limit of the chamber 16, but also pays out additional lengths of the stretches 52,54. Furthermore, upward swinging of the arm 70 necessarily raises the takeup roller 80 which substantially increases the amount of belt length available to the stretches 52 and 54.

This process continues until the bale reaches essentially full size as illustrated in FIG. 2 (said bale being denoted by the numeral 120 in that figure), and at that point in time (but preferably after wrapping the bale 120 with a suitable binding material not shown) the entire rear half of the baler 10 may be swung upwardly and rearwardly about a pivot axis 122 adjacent the upper extremity of the baler 10 so as to permit the finished bale 120 to be discharged onto the ground. As will be understood by those skilled in the art, the sidewalls 12,14 are divided into front and rear portions to permit such discharging action, the dividing line for such portions being substantially along the line 124 illustrated in FIG. 1. The shafts 30, 32, 34, 36 and 38 swing with the rear half of the baler 10 during such discharge, and after this action is completed, the rear half of the baler 10 is swung back downwardly to its normal position whereupon all of the components resume the condition of FIG. 1.

It is important to note that the arm assembly 70 itself applies a downwardly directed compacting force to the bale during its formation, such force being transmitted to the bale via the shafts 58 and 60 which normally ride directly on the periphery of the bale as illustrated, for example, in FIG. 2. Similarly, the belt stretches 52 and 54 are applying compacting force to the bale throughout the forming process.

In the event that crop materials tend to stray out of the chamber 16 via the gaps between the belts 62, such material will tend to be expelled if near the center of the shafts by the adjacent belts 62. At the opposite ends of the shaft 58, that expelling function is provided by the expelling collars 110 which aggressively engage any material tending to collect at that location and to fling such material downwardly and outwardly away from the gap 126 defined between the two shafts 58,60. The scallops 118 are particularly useful in this regard since they are moving at greater peripheral speed than the adjacent periphery of the shaft 58 itself due to their more radially outwardly disposed positions.

Preferably, as noted above, the collars 110 are located in the "dead" space 108 between the moving edge 68a of the adjacent belt 62 and the corresponding lever arm 66 or 68. Furthermore, they are preferably carried only by the shaft 58 and not also by the shaft 60. Shaft 60 rotates upwardly and into the gap 126 from the bale chamber 16 and thus has a tendency to direct stray materials up through the gap 126 for accumulation on top of the lever assembly 64. By making the shaft 60 more aggressive through the addition of a scalloped collar 110 thereto, this tendency would be further promoted. It has been found that the attachment of collars 110 to opposite ends of the front shaft 58 is more than adequate to maintain the immediate vicinity clear of crop buildup, and such is an important aspect of the present invention.

We claim:

1. In a rotary crop baler:
   a pair of spaced apart sidewalls defining a baling chamber therebetween;
   a pair of spaced apart arms shiftable generally vertically within said chamber adjacent opposite ones of said sidewalls;
   a pair of shafts spanning said arms for shiftable movement therewith and normally bearing against and riding upon the upper periphery of a bale during its formation,
   said shafts being transversely spaced apart a sufficient distance to define a gap therebetween;
   a flexible, driven web disposed within said chamber for rolling crop material into a cylindrical bale,
   said web including a pair of stretches in engagement with opposite ones of said shafts and normally driven in mutually opposite, generally vertical directions through said gap,
   one of said shafts and web stretches normally operating in a direction to move the one stretch generally downwardly away from said gap and toward a bale forming in the chamber,
   the other of said shafts and web stretches normally operating in a direction to move the other web stretch generally upwardly away from the forming bale and toward said gap; and
   means carried only by said one shaft for engaging and expelling stray crop material from the vicinity of said shafts during bale formation,
   said engaging and expelling means including a pair of devices adjacent opposite ends of said one shaft, each located between the corresponding arm and the proximal edge of the web stretch associated with said one shaft.

2. In a rotary crop baler as claimed in claim 1, wherein each device comprises a collar having an inner shaft-engaging extremity and an outer crop-engaging extremity.

3. In a rotary crop baler as claimed in claim 2, wherein said outer extremity is provided with a circumferential series of projections.

4. In a rotary crop baler as claimed in claim 1, wherein each device comprises a pair of semi-circular collar sections clamped about said shaft to render said extremities at least substantially continuous.

* * * * *